July 14, 1942.  B. C. MONROE  2,289,448
DEMOUNTABLE WHEEL
Filed April 25, 1941  2 Sheets-Sheet 1
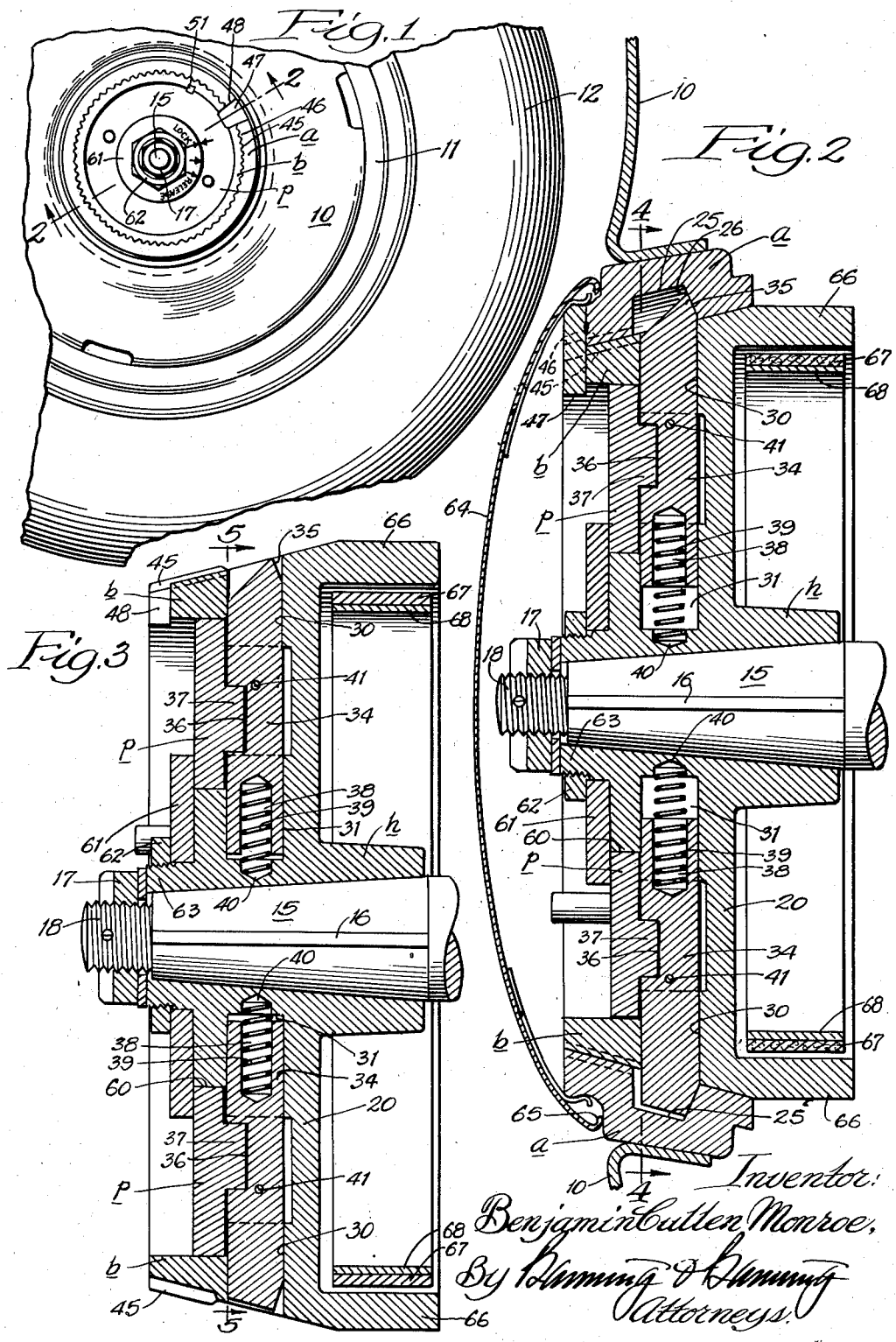

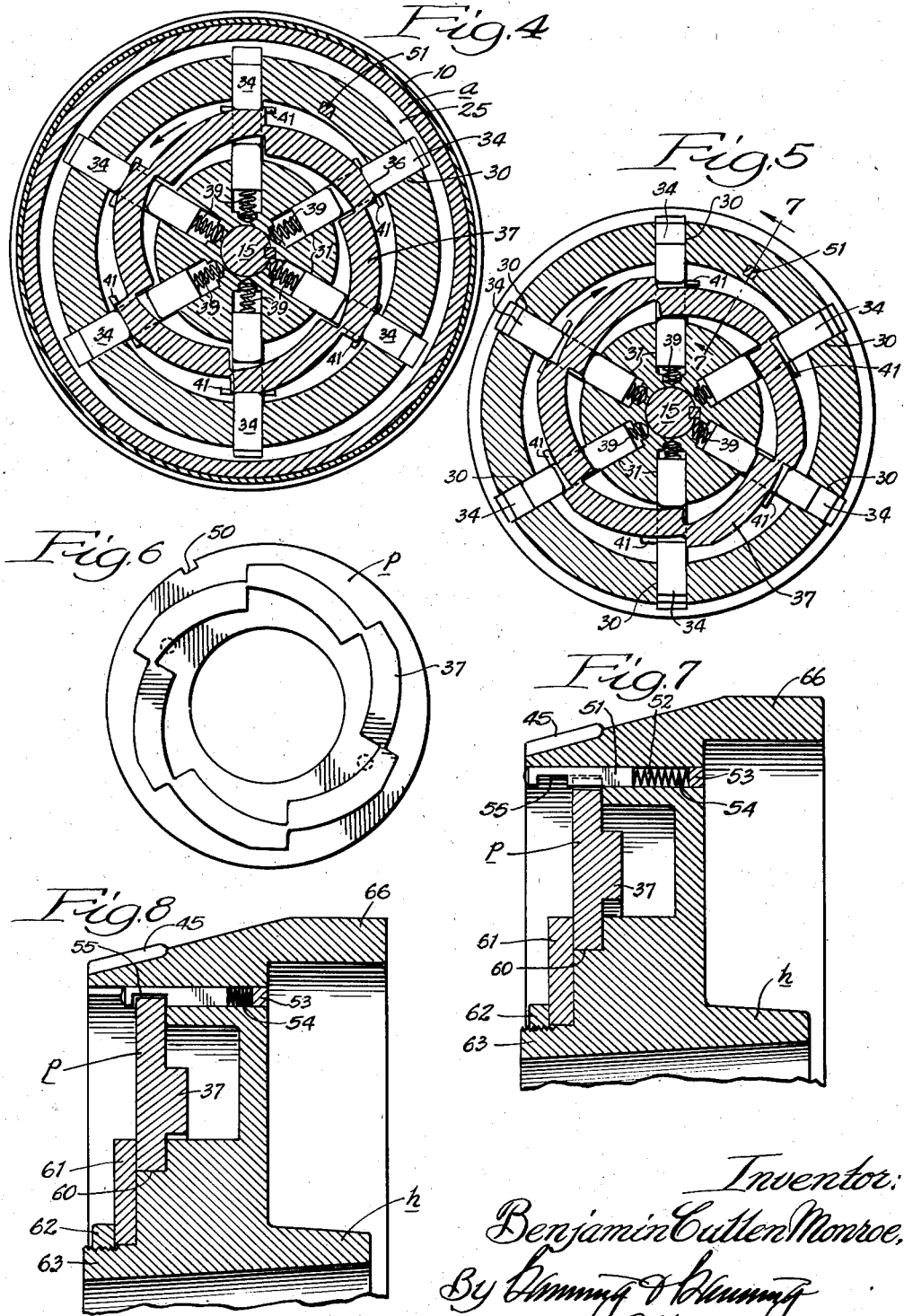

Patented July 14, 1942

2,289,448

UNITED STATES PATENT OFFICE 2,289,448

DEMOUNTABLE WHEEL

Benjamin Cullen Monroe, Tuscola, Ill.

Application April 25, 1941, Serial No. 390,379

6 Claims. (Cl. 301—9)

My present invention is concerned with a wheel which may be readily and securely mounted upon, or demounted from, a hub which is carried upon a spindle. Such a wheel will probably have its greatest usefulness in the field of vehicles such as automobiles, trucks, etc.

The present improvements which are concerned with a wheel of the kind described, are directed in large part to certain features of construction which conduce to streamlining, assure a positive and dependable lock for the wheel upon the hub, facilitate ready operation of the locking means whereby the wheel may be easily removed from, or replaced upon, the hub, as required, prevent noise or rattle of the various parts which enter into the construction, and which is simple, durable, easily operated, and producible with a minimum of expense.

These and other objects of my invention will appear from the embodiment thereof which is shown in the accompanying drawings in the manner following:

Figure 1 is a fragmentary view in side elevation of the present wheel mounted upon its associated hub from which the cap has been removed to show the relationship of certain of the parts;

Fig. 2 is an enlarged detail in section taken on line 2—2 of Fig. 1;

Fig. 3, which is a view similar to Fig. 2, shows the hub with the wheel removed from the view;

Figs. 4 and 5 are transverse sections taken on lines 4—4 and 5—5 of Figs. 2 and 3, respectively;

Fig. 6 is a view in elevation of the cam plate per se;

Fig. 7 is an enlarged detail in section, taken on line 7—7 of Fig. 5; and

Fig. 8, which is a view similar to Fig. 7, shows the lock for the cam plate in the position which frees the latter for operative movement.

The wheel illustrated in Fig. 1 is of the type which comprises a tapered inner ring $a$ with which is connected a radial disk 10 supporting at its outer periphery a rim 11 on which is mounted a tire 12. The parts just enumerated constitute the wheel which, as a unit, as adapted for mounting upon, or removal from, the hub unit which will now be described.

Fitted upon a spindle 15 is a hub $h$. As shown, the spindle is tapered as is also the interior of the hub, permitting the latter to be immovably fitted upon the axle, with the aid of a spline 16, and there retained in place as by means of a nut 17 which is screwed upon the threaded spindle extremity 18. The hub is formed with a radially extending wall 20 which carries at its outer periphery a ring $b$ whose outer surface is tapered, as best shown in Fig. 2. The taper of the wheel ring $a$ corresponds to that of the hub ring $b$ so that, upon fitting the wheel to the hub, the two tapering surfaces will interengage closely. By this means the wheel can be advanced axially upon the hub up to the point which is permitted by the taper between their contacting surfaces.

Formed on the inner surface of the wheel ring $a$ is a peripheral channel 25 having an inclined rear surface 26. This channel lies opposite a plurality of interrupted guideways arranged radially in the hub. Each guideway comprises a passageway 30 transversing the hub ring $b$ and a second passageway 31, aligned with the first, which is extended into, but not through, the hub. Each guideway at its outer end opens out opposite the channel of the wheel ring. Between the two passageways of each guideway is an open space.

Fitted within each guideway is a locking bolt 34 whose acting end is desirably chamfered to provide a cam face 35 in substantial parallelism with the inclined rear face 26 of the wheel channel. Each bolt in its center region is recessed as at 36 to receive a spiral cam 37 carried by an annular plate $p$ which is rotatably mounted on the hub. At its inner end each bolt is socketed at 38 to receive a compression spring 39 whose inner end is fitted within a shallow socket 40 at the end of the guideway. As shown herein, the hub is provided with six locking bolts, spaced apart equally, and all movable radially in unison under the control of the six spiral cams 37 which are operated by the common plate $p$. The spring associated with each bolt exerts an outward radial force, but cannot advance the bolt except when the cam plate is rotated to permit such movement. When in the outward locking position (see Figs. 2 and 4) the spiral cams act positively to prevent retraction of the bolts. The wheel is accordingly locked securely upon the tapered hub ring, and the cam faces of the locking bolts force the wheel to a tight fit upon the ring so as to assure a condition of immovability thereupon. The springs prevent rattle and noise, should there be any play or looseness in the bolts. In the unlocked position (see Figs. 3 and 5) the spiral cams again act to positively maintain the bolts in retracted positions; all interference is thereby removed to demounting of the wheel from the hub by an axial movement in an outward direction. To restrain the locking bolts from springing out of their guideways when the cam plate is removed, as for purposes of service, I may provide in each bolt a pin 41 having one end protruding therefrom to a position which will engage the end of the associated guideway 30 to thereby limit the outward movement of the bolt with consequent disassembly thereof.

In order that a driving connection may be established between the wheel and hub, I provide upon the tapered face of the hub ring b teeth 45 adapted to mesh with other like teeth 46 formed on the engaging face of the wheel ring. To assist in correct positioning of the wheel upon the hub, a finder lug 47 is extended inwardly from the wheel ring a to fit within a seat 48 that is provided upon the outer face of the hub ring b. The cam plate is also provided adjacent its periphery with a notch 50 into which may enter a detent 51 here shown as a square bolt which in part is slidably received within a passageway 52 that is extended through the hub ring in a direction parallel its axis (see Figs. 6, 7, and 8). One end of this passageway may be plugged as at 53 to receive thrust from a compression spring 54 which exerts an opposite force against the end of the bolt so that the detent is normally maintained in the locked position shown in Fig. 7. The passageway within which the detent slides lies opposite the periphery of the cam plate, partly within and partly without the contour thereof. At one point in the bolt near its outer end is a notch 55 adapted to receive the cam plate periphery when the detent is inwardly pressed to the position shown in Fig. 8. When so positioned, the cam plate is free for rotation. By some such means as this the cam plate is normally locked against movement from the position of Fig. 4 where the bolts are all maintained in locking position; but when the detent is pressed in, the cam plate is then free to be rotated to its opposite position for withdrawing the bolts from locking position whereby to free the wheel for removal from the hub.

The cam plate which is rotatably mounted on the hub may be fitted within an annular seat 60 where it is held as by means of a locking plate 61 secured in position by a nut 62 which is screwed upon a threaded shoulder 63 protruding from the hub. All of the locking mechanism herein described is thoroughly protected by the covering cam plate and this, in turn, may be covered over by a hub cap 64 whose turned peripheral edge 65 may be snap-locked within a shallow groove extending around the hub ring b adjacent its front face. Extending rearwardly from the hub ring is a flange 66 whose inner surface is adapted to be frictionally engaged by a lining 67 carried upon a brake band 68. By the provision of this rearwardly extending flange I am enabled to accommodate within the hub itself the brake mechanism for the wheel, reducing to a minimum the space required for this purpose.

A vehicle wheel encounters severe conditions in use. For this reason it is important that any connection permitting removal of the wheel from its hub be absolutely safe, and at the same time thoroughly protected so that, when the occasion arises, this connection may be disestablished to permit ready removal of the wheel. The mechanism herein described will successfully meet all such requirements. The movements of the locking bolts are positively controlled by the cam plate, and this in turn may be positively locked so that the bolts themselves are securely locked. In this way adequate provision is made for coping with the centrifugal forces which are developed when the wheel is in use. The positions of the bolts are determined positively by factors other than the springs associated therewith, so that failure of any spring will not endanger the security of the lock which is provided between the hub and wheel mounted thereon. These springs serve to take up any slack behind the bolts, and that is their principal purpose. The spiral cams are desirably formed integrally with the plate whereon they are carried, and it may be advantageous to provide for a slight clearance between these cams and the locking bolts controlled thereby. This makes for greater ease in operation when the wheel is to be mounted or demounted.

The locking bolts serve primarily to hold the wheel immovably upon the hub. They are not required to transmit any driving force, other means being provided for this purpose. The number of movable parts is maintained at a minimum, and they may for the most part be formed by stamping operations. There are no projections outwardly from the wheel such as might strike curbs with detrimental effect. The wind resistance is also reduced to a minimum owing to the streamlining which has been attained.

I claim:

1. In combination, a wheel unit comprising a ring having a tapered inner face with a channel formed peripherally therein, a hub having a ring with a tapered outer face for receiving the wheel ring in a fixed position thereupon, interengaging means extending between the two rings to establish a releasable driving connection therebetween, a plurality of radially movable locking bolts carried by the hub and advanceable into the channel of the wheel ring for locking the latter upon the hub, a common operating means for positively advancing and retracting the several locking bolts in unison, and interengaging means on the acting ends of the locking bolts and wheel ring tending to advance the wheel ring axially to its limit position upon the tapered hub ring.

2. In combination, a wheel unit comprising a ring having a tapered inner face with a channel formed peripherally therein, a hub having a ring with a tapered outer face for receiving the wheel ring in a fixed position thereupon, a plurality of radially movable locking bolts carried by the hub and advanceable into the channel of the wheel ring for locking the latter upon the hub, a common operating means for positively advancing or retracting the several locking bolts in unison, and a detent providing a positive lock to prevent movement of the operating means from a predetermined adjusted position.

3. In combination, a wheel unit comprising a ring, a hub having a ring for receiving the wheel ring in a fixed position thereupon, the hub being formed with a radial wall through which are radial guideways each interrupted intermediately the ends thereof, a locking bolt slidably received within each guideway and exposed through the interruption thereof, a plate having a rotatable mounting on the hub and over the interruptions of the several guideways in the hub, interengaging cam means on the plate and several bolts whereby, upon rotation of the plate, the cams in unison are advanced or retracted radially to engage the wheel ring or disengage therefrom, and means for positively locking the cam plate in a fixed position.

4. In combination, a wheel unit comprising a ring, a hub having a ring for receiving the wheel ring in a fixed position thereupon, the hub comprising a radial wall with guideways therein, locking means slidably fitted within the guideways adapted in one position to engage with the wheel ring to hold the wheel securely upon the hub and in another position to disengage from the wheel ring to permit removal of the wheel from the hub, there being a seat formed on the hub, an operating plate rotatably fitted in the seat and serving to cover the locking means within the hub guideways, means for securing the operating plate against movement in any except a rotatable direction, and a detent for locking the operating plate fixedly in a position wherein the locking means are maintained in engaging position with the wheel ring.

5. In combination, a wheel unit comprising a ring, a hub having a ring for receiving the wheel ring in a fixed position thereupon, the hub comprising a radial wall formed therein with guideways and with a seat adjacent the several guideways, locking means movably fitted within the several guideways adapted, when advanced, to engage with the wheel ring to secure the latter fixedly upon the hub, an operating plate rotatably fitted in the seat and having connection with the several locking means for operating the same, means forming a positive lock for the operating plate whereby it is normally held against movement from a position in which the locking means are maintained in engagement with the wheel ring, the locking plate providing a closure for the several guideways, and interengaging means on the wheel and hub rings for establishing a positive driving connection therebetween.

6. In combination, a wheel unit comprising a ring having an inclined inner face with a channel formed peripherally therein, a hub having a ring with an inclined outer face for receiving the wheel ring in a fixed position thereupon, there being a plurality of aligned radial guideways in pairs traversing the hub and hub ring in register with the channel of the wheel ring, a bolt slidably fitted within each pair of guideways adapted when advanced outwardly therein to enter the wheel ring channel to lock therewith, each bolt being socketed at its inner end and the hub being formed with a socket at the inner end of each guideway, a compression spring fitted within each bolt socket and resting at one end within the hub socket adapted to exert against the associated bolt a thrust force tending to advance it outwardly, a plate fitted upon the hub and rotatable thereon in a plane transversely of its axis, a multiple cam associated with the rotatable plate, operable thereby, and coacting with the several bolts adapted, when turned in one direction to assist the bolts in an outward advance in unison to locking position in response to the thrust forces of their associated springs and, when turned in the opposite direction, to retract the several bolts in unison from locking position counter to the tension of their associated springs, and means for locking the cam plate in the first named rotative position whereby to positively maintain the bolts in locking position.

BENJAMIN CULLEN MONROE.